(12) United States Patent
Zula

(10) Patent No.: US 8,857,787 B2
(45) Date of Patent: Oct. 14, 2014

(54) SYSTEM AND METHOD FOR CONTROLLING AN ELECTRO-PNEUMATIC DEVICE

(75) Inventor: Daniel P. Zula, North Ridgeville, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 302 days.

(21) Appl. No.: 13/116,120

(22) Filed: May 26, 2011

(65) Prior Publication Data

US 2012/0298895 A1    Nov. 29, 2012

(51) Int. Cl.
| | |
|---|---|
| F16K 31/06 | (2006.01) |
| G05D 7/06 | (2006.01) |
| B60T 13/68 | (2006.01) |
| B60T 8/32 | (2006.01) |
| B60T 13/66 | (2006.01) |

(52) U.S. Cl.
CPC ............. *B60T 8/3255* (2013.01); *B60T 13/683* (2013.01); *B60T 13/662* (2013.01)
USPC ...................................... 251/129.04; 700/282

(58) Field of Classification Search
USPC .............. 251/129.04, 129.05; 137/487.5, 557; 700/282
See application file for complete search history.

(56) References Cited

U.S. PATENT DOCUMENTS

| | | | |
|---|---|---|---|
| 3,891,914 A | 6/1975 | Akita | |
| 4,004,258 A | 1/1977 | Arnold | |
| 4,535,401 A | 8/1985 | Penn | |
| 4,550,261 A | 10/1985 | Hormel et al. | |
| H678 H * | 9/1989 | Baker et al. | 340/12.33 |
| 5,396,973 A | 3/1995 | Schwemmer et al. | |
| 5,936,520 A | 8/1999 | Luitje et al. | |
| 5,942,892 A * | 8/1999 | Li | 324/207.16 |
| 6,073,644 A * | 6/2000 | Friedmann et al. | 137/1 |
| 6,351,199 B1 | 2/2002 | Perini | |
| 6,351,691 B1 * | 2/2002 | Mansfield | 700/282 |
| 6,370,448 B1 * | 4/2002 | Eryurek | 700/282 |
| 6,581,619 B1 * | 6/2003 | Christiani et al. | 137/14 |
| 7,013,178 B2 | 3/2006 | Reinke et al. | |
| 7,464,721 B2 * | 12/2008 | Perry et al. | 137/14 |
| 7,831,338 B1 * | 11/2010 | Haydu | 700/276 |
| 2007/0168086 A1 * | 7/2007 | Schultz | 700/282 |

FOREIGN PATENT DOCUMENTS

EP    1319566 A2    6/2003

OTHER PUBLICATIONS

Bendix M-32 and M-32QR AntiLock Modulators, Service Data Sheet SD-13-4870, BW2335, May 2004.
Bendix M-32 and M-32QR AntiLock Modulators, Service Data Sheet No. SD-13-4870, May 2004.

* cited by examiner

*Primary Examiner* — Stephen M Hepperle
*Assistant Examiner* — Seth W Mackay-Smith
(74) *Attorney, Agent, or Firm* — Calfee, Halter & Griswold LLP

(57) ABSTRACT

An electro-pneumatic device includes a sensor portion and a valve portion. The sensor portion, which includes a sensor, receives and transmits electronic control signals of a plurality of frequencies. The sensor portion is powered by a first of the frequencies of the received control signals. The valve portion electrically communicates with the sensor. The valve portion includes a valve that is alternately set to an open state and a closed state based on a second of the plurality of frequencies of the received control signals. The sensor senses a delivery pressure of the valve and transmits electronic data signals representing the delivery pressure at a third of the plurality of frequencies.

19 Claims, 4 Drawing Sheets

SYSTEM AND METHOD FOR CONTROLLING AN ELECTRO-PNEUMATIC DEVICE

BACKGROUND

The present invention relates to an electro-pneumatic device. It finds particular application in conjunction with controlling the electro-pneumatic device and will be described with particular reference thereto. It will be appreciated, however, that the invention is also amenable to other applications.

Conventional electro-pneumatic valves are driven by a controller in an open-loop manner. In open-loop designs, the controller relies on other system state variables to gauge whether the valve is functioning correctly. Signals from the other system state variables take time to reach the controller. Therefore, if the valve malfunctions, a delay exists between the time the malfunction occurs and the time the malfunction is detected by the controller. In safety-critical applications, the time delay may be too long for the controller to mitigate the effects of the malfunctioning valve. For example, if the valve malfunction results in too much braking pressure being applied, the time delay in conventional open-loop electro-pneumatic valves before the controller detects and mitigates the malfunctioning valve may be unacceptably long.

The present invention provides a new and improved apparatus and method which addresses the above-referenced problems.

SUMMARY

In one aspect of the present invention, an electro-pneumatic device includes a sensor portion and a valve portion. The sensor portion, which includes a sensor, receives and transmits electronic control signals of a plurality of frequencies. The sensor portion is powered by a first of the frequencies of the received control signals. The valve portion electrically communicates with the sensor. The valve portion includes a valve that is alternately set to an open state and a closed state based on a second of the plurality of frequencies of the received control signals. The sensor senses a delivery pressure of the valve and transmits electronic data signals representing the delivery pressure at a third of the plurality of frequencies.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

Figure 1:
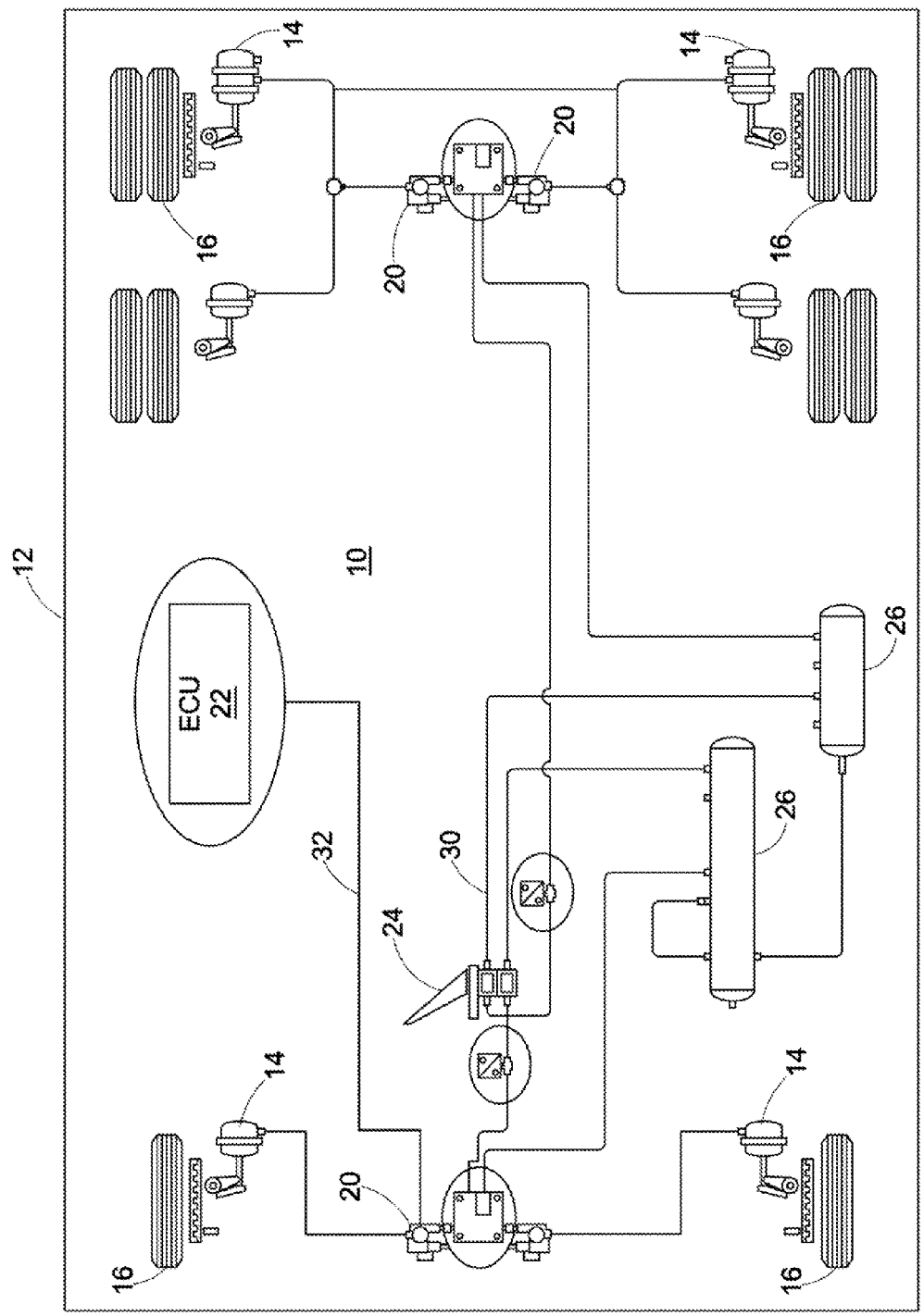
FIG. 1 illustrates a schematic representation of an exemplary vehicle braking system in accordance with one embodiment of an apparatus illustrating principles of the present invention.

With reference to FIG. 1, a simplified component diagram of an exemplary vehicle braking system 10 of a vehicle 12 is illustrated in accordance with one embodiment of the present invention. The braking system 10 includes brakes 14, which are associated with respective wheels 16, electro-pneumatic valves 20, which are electrically controlled by an electronic control unit (ECU) 22, a brake pedal 24, and a source 26 (e.g., reservoir) of pressurized fluid (e.g., air). Various air lines 30 pneumatically connect the reservoir(s) 26, the brake pedal 24, the electro-pneumatic valves 20, and the brakes 14. Electrical lines 32 (e.g., a power and control bus) electrically connect the electro-pneumatic valves 20 to the ECU 22. For purposes of illustration, only one of the air lines 30 is referenced, and only one of the electrical lines 32 is illustrated.

Figure 2:
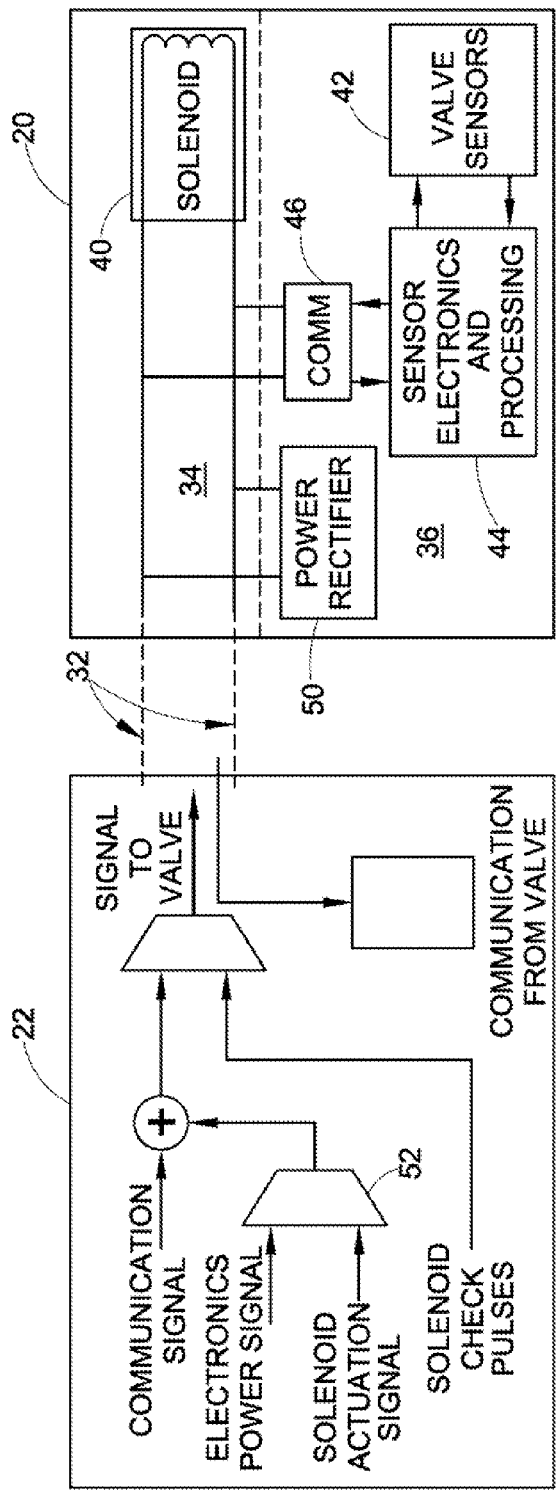
FIG. 2 illustrates a schematic representation of an electro-pneumatic control system in accordance with one embodiment of an apparatus illustrating principles of the present invention.
Figure 3:
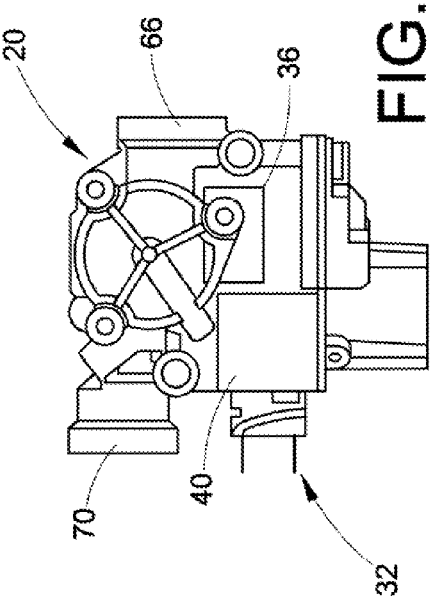
FIG. 3 illustrates an exterior view of a valve shown in FIG. 2 in accordance with one embodiment of an apparatus illustrating principles of the present invention.

FIG. 2 is a simplified component diagram is illustrated of the ECU 22, one of the electro-pneumatic valves 20, and the electrical lines 32 between the electro-pneumatic valve 20 and the ECU 22 in accordance with one embodiment of the present invention. FIG. 3 illustrates an exterior view of the valve 20.

With reference to FIGS. 2 and 3, in one embodiment, the electro-pneumatic valve 20 is a modulator, which includes a valve portion 34 and sensor portion 36. The valve portion 34 includes an electromechanical valve 40. It is contemplated that the electromechanical valve 40 is a solenoid valve. The sensor portion 36 includes a valve sensor 42, sensor electronics 44, a communication filter 46, and a power filter 50 (e.g., a power rectifier). The solenoid valve 40, valve sensor 42, sensor electronics 44, communication filter 46, and the power filter 50 all electrically communicate with the power and control bus 32.

The ECU 22 generates communication messages, power signals for the valve electronics, solenoid actuation signals, and solenoid error-check signals that are transmitted to the electro-pneumatic valve 20 via the power and control bus 32. In the illustrated embodiment, mixing electronics 52 superimpose the communication messages onto the valve electronic power signals or the solenoid actuation signals from the ECU 22. The sensor electronics can transmit communication messages back to the ECU 22.

The messages transmitted to the electro-pneumatic valves 20 are referred to as control messages. As discussed above, the electronic control unit 22 generates a communication message for the electro-pneumatic valves 20. The communication message includes an instruction to, for example, the sensor portion 36 of the electro-pneumatic valve 20. The instruction may cause the sensors 42 to begin (or stop) sensing a delivery pressure of the solenoid 40 and/or begin (or stop) transmitting messages back to the electronic control unit 22 indicating the delivery pressure of the solenoid 40. The power signal is for powering the sensor portion 36 of the electro-pneumatic valve 20. The solenoid actuation signal controls the state of the solenoid 40. For example, the solenoid actuation signal may set the solenoid 40 to either an open state or a closed state. While in the open state, a delivery port 66 of the electro-pneumatic valve 20 fluidly communicates with a supply port 70 of the electro-pneumatic valve 20, so that fluid pressure at the supply port 70 is delivered to the delivery port 66. While in the closed state, the delivery port 66 does not fluidly communicate with the supply port 70.

Figure 4:
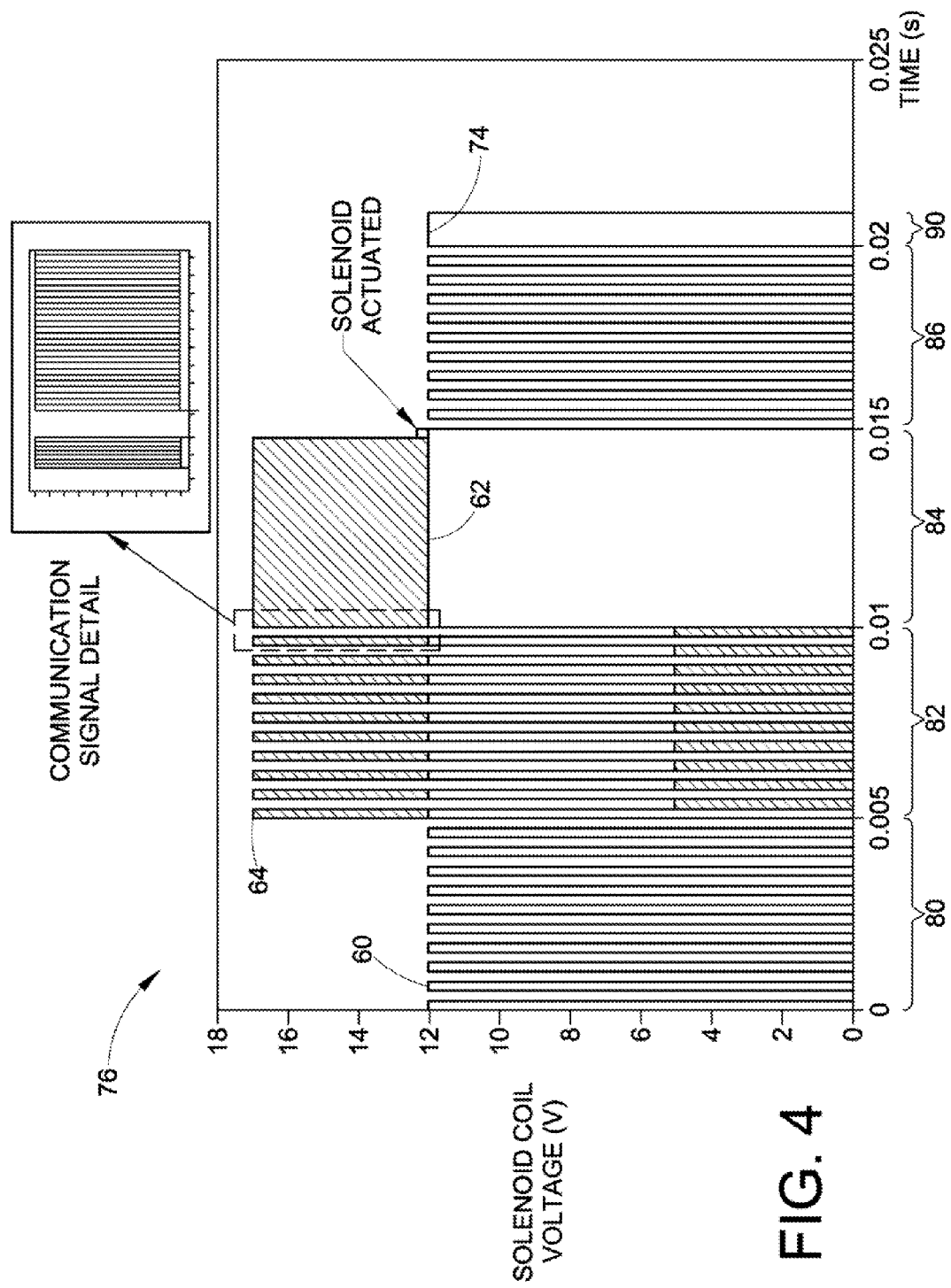
FIG. 4 illustrates a timing diagram in accordance with one embodiment of an apparatus illustrating principles of the present invention.

With reference to FIG. 4, an exemplary communication timing diagram 76 of the signals and messages discussed above is illustrated in accordance with one embodiment of the present invention. The y-axis of the diagram 76 represents a sample voltage on a coil of the solenoid 40, and the x-axis of the diagram 76 represents time (e.g., seconds).

With reference to FIGS. 2-4, it is contemplated that the power signal generated by the electronic control unit 22 has a first frequency 60, the actuation signal generated by the electronic control unit 22 has a second frequency 62, and the communication message generated by the electronic control unit 22 has a third frequency 64. In one embodiment, the first frequency is about 10 times the second frequency, and the third frequency is about 100 times the second frequency. It is also contemplated that the second frequency is about 66 Hz to about 100 Hz.

The electronic control unit 22 determines which of the brakes 14 and, consequently, which of the solenoids 40 in the electro-pneumatic valves 20 should be applied based on inputs received from various vehicle components. The electronic control unit 22 transmits messages to one or both of the electro-pneumatic valves 20, via the power and control bus 32, based on the desired braking requirements for each wheel end.

The communication message, the power signal, and the solenoid actuation signal are combined and superimposed by the electronic control unit 22, as discussed above, to create the control message. The control message is transmitted from the electronic control unit 22 to the electro-pneumatic valve 20 via the power and control bus 32.

Once the electro-pneumatic valve 20 receives the control message from the electronic control unit 22, the power filter 50 filters the first frequency 60 from the control message. The filtered first frequency of the control message is used for powering the sensor portion 36 of the electro-pneumatic valve 20. The second frequency 62 of the control message is used for actuating and de-actuating the solenoid 40. For example, when actuated, the solenoid 40 is set to the open state; when de-actuated, the solenoid 40 is set to the closed state. The communication filter 46 filters the third frequency 64 from the control message. The filtered third frequency of the control message is used for controlling the electro-pneumatic valve 20. For example, the sensor electronics 44 may receive the filtered third frequency of the communication message as an instruction to cause the sensors 42 to begin sensing the delivery pressure of the solenoid 40 and/or to begin transmitting messages back to the electronic control unit 22 indicating the delivery pressure.

Once the sensor electronics 44 receive respective instructions, the sensors 42 begin sensing the delivery pressure of the solenoid 40 and/or the sensor electronics 44 begin transmitting data signals (e.g., messages) back to the electronic control unit 22 indicating the delivery pressure. In one embodiment, the sensor electronics 44 encode the delivery pressure into the data signals transmitted back to the electronic control unit 22. It is also contemplated that the sensor electronics 44 generate the data messages transmitted back to the electronic control unit 22 according to the third frequency.

Once the electronic control unit 22 receives the data messages representing the delivery pressure of the solenoid 40, the electronic control unit 22 checks the actual delivery pressure against the desired delivery pressure.

If the actual delivery pressure is not the same pressure as the desired pressure, the ECU 22 may command the valve as appropriate to correct the discrepancy and/or perform other system level functions to mitigate the effects of the discrepancy.

At intervals between the communication message, power signal, and solenoid actuation signals, the ECU 22 will periodically transmit solenoid error-check pulses to electrically test the solenoids for an open or short circuit condition.

Figure 5:
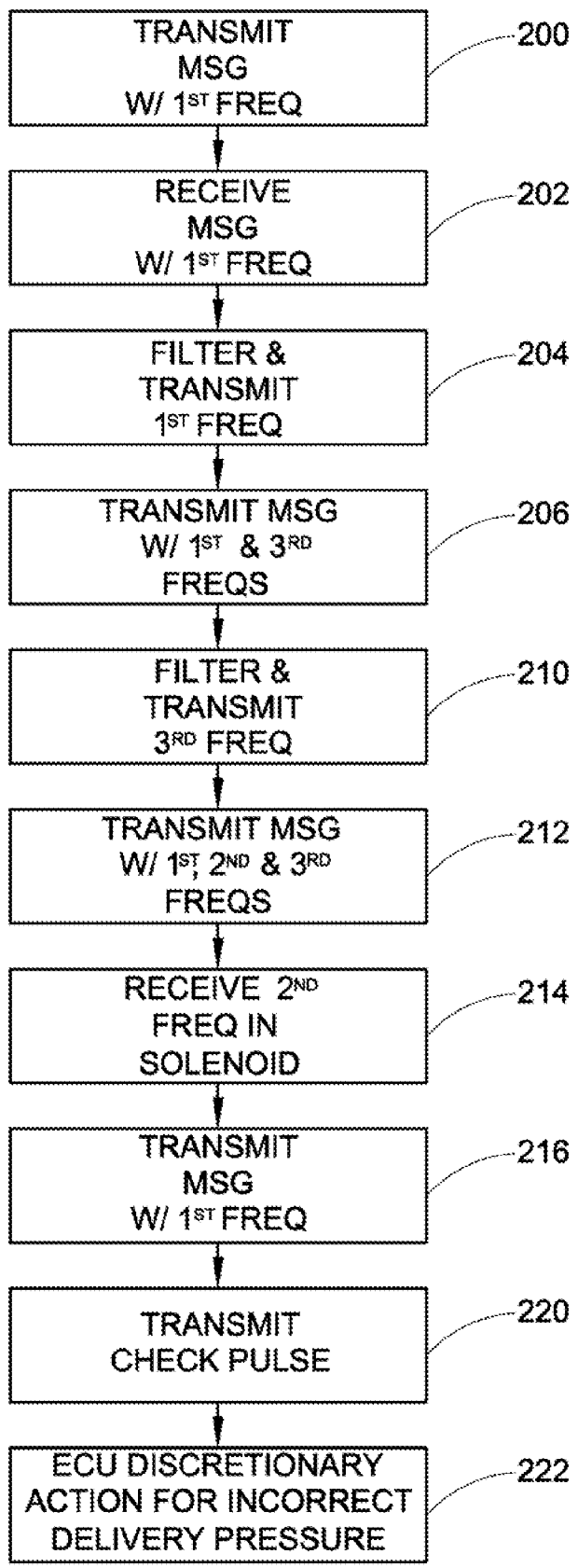
FIG. 5 is an exemplary methodology of controlling an electro-pneumatic valve in accordance with one embodiment illustrating principles of the present invention.

With reference to FIG. 5, an exemplary methodology of the system shown in FIGS. 1-4 for controlling an electro-pneumatic device is illustrated. As illustrated, the blocks represent functions, actions and/or events performed therein. It will be appreciated that electronic and software systems involve dynamic and flexible processes such that the illustrated blocks and described sequences can be performed in different sequences. It will also be appreciated by one of ordinary skill in the art that elements embodied as software may be implemented using various programming approaches such as machine language, procedural, object-oriented or artificial intelligence techniques. It will further be appreciated that, if desired and appropriate, some or all of the software can be embodied as part of a device's operating system.

With reference to FIGS. 1-5, in a step 200, during a first time period 80 (e.g., 0-0.005 seconds), the electronic control unit 22 transmits a signal having the first frequency 60 (e.g., a power signal) to the electronics in the electro-pneumatic valve 20. The electro-pneumatic valve 20 receives the signals having the first frequency 60 in a step 202. In a step 204, during the first time period 80, the power filter 50 filters the first frequency 60 of the message and transmits that portion of the signal (e.g., the signals having the first frequency 60) to the sensor electronics 44, the communication filter 46, and the sensor 42 for powering those components 44, 46, 42.

In a step 206, during a second time period 82, the electronic control unit 22 continues to transmit a signal having the first frequency 60 for powering the sensor electronics 44, the communication filter 46, and the sensor 42. Also, during the second time period 82, the message transmitted from the electronic control unit 22 (and received by the electro-pneumatic valve 20) includes signals at the third frequency 64 superimposed with the signals at the first frequency 60. During the second time period 82, the power filter 50 filters the first frequency 60 of the message and transmits that portion of the message (e.g., the signals having the first frequency 60) to the sensor electronics 44, the communication filter 46, and the sensor 42 for powering those components 44, 46, 42. In addition, in a step 210, the communication filter 46 filters the third frequency 64 of the message and transmits that portion of the message (e.g., the signals having the third frequency 64) to the sensor electronics 44 for instructing the sensor electronics 44 to activate the sensors 42 for measuring the delivery pressure at the delivery port 66 of the solenoid 40. The third frequency 64 of the message may also instruct the sensor electronics 44 to begin transmitting messages, which indicate the delivery pressure, back to the electronic control unit 22.

In a step 212, during a third time period 84, the electronic control unit 22 continues to transmit a message having the first and third frequencies 60, 64, respectively. Also, during the third time period 84, the message transmitted from the electronic control unit 22 (and received by the electro-pneumatic valve 20) includes signals at the third frequency 64 superimposed with the signals at the first and second frequencies 60, 62, respectively. During the third time period 84, the power filter 50 filters the first frequency 60 of the message and transmits that portion of the message (e.g., the signals having the first frequency 60) to the sensor electronics 44, the communication filter 46, and the sensor 42 for powering those components 44, 46, 42. The communication filter 46 also filters the third frequency 64 of the message and transmits that portion of the message (e.g., the signals having the third frequency 64) to the sensor electronics 44, as discussed above. In addition, in a step 214, the solenoid 40 receives the second frequency 62, which activates the solenoid 40 (e.g., sets the solenoid to either the open or closed state).

In a step 216, during a fourth time period 86, the electronic control unit 22 transmits a message having signals at the first frequency 60 (like during the first time period 80).

During a fifth time period 90, a check pulse is transmitted while no communication message, power signal, solenoid activation is being transmitted in a step 220. During the fifth time period 90, a message transmitted from the electronic control unit 22 has signals at a fourth frequency 74, which include the solenoid error-check pulse signal.

If an out-of-tolerance exists or if the delivery pressure is simply too high or too low, the electronic control unit 22 can take appropriate action, in a step 222, to correct the condition. For example, if the electronic control unit 22 determines the delivery pressure is too high, the electronic control unit 22 may transmit a message to change the state of the solenoid 40 to closed. Since the electronic control unit 22 determines the delivery pressure of the solenoid 40 directly from the delivery port 66 (e.g., a closed-loop system), the electronic control unit 22 may respond to undesirable delivery pressures relatively quicker than when the electronic control unit 22 determines the delivery pressure of the solenoid indirectly from other vehicle system state variables (e.g., open-loop systems).

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

I claim:

1. An electro-pneumatic device, comprising
    a sensor portion, including a sensor, receiving and transmitting electronic control signals of a plurality of frequencies via a power and control bus, the sensor portion being, powered by a first of the frequencies of the control signals received by the sensor portion during a first time period; and
    a valve portion electrically communicating with the sensor via the power and control bus, the valve portion including a valve being, alternately set to an open state and a closed state based on a second of the plurality of frequencies of the received control signals, the sensor sensing a delivery pressure of the valve and transmitting electronic data signals representing the delivery pressure at a third of the plurality of frequencies, the first frequency being faster than the second frequency, the third frequency being faster than the first frequency, the third frequency being superimposed with the first frequency in the control signals received by the sensor portion during a second time period, which is after the first time period, and the third frequency being superimposed with the first frequency and the second frequency in the control signals received by the sensor portion during a third time period which is after the second time period.

2. The electro-pneumatic device as set forth in claim 1, wherein:
    the sensor portion receives the electronic control signals from the associated power and control bus; and
    the sensor portion transmits the electronic data signals to the associated power and control bus.

3. The electro-pneumatic device as set forth in claim 1, wherein:
    the first frequency is about 10 times the second frequency; and
    the third frequency is about 100 times the second frequency.

4. The electro-pneumatic device as set forth in claim 3, wherein:
    the second frequency is about 66 Hz to about 100 Hz.

5. The electro-pneumatic device as set forth in claim 1, wherein:
    the valve portion receives an error-check pulse signals at a fourth frequency.

6. The electro-pneumatic device as set forth in claim 5, wherein:
    the first frequency is about 10 times the second frequency;
    the third frequency is about 100 times the second frequency; and
    the fourth frequency is about 5 times the second frequency.

7. The electro-pneumatic device as set forth in claim 1, wherein the sensor portion includes:
    a power filter filtering the first frequency of the received control signals, the filtered first frequency being transmitted to the sensor for powering the sensor.

8. The electro-pneumatic device as set forth in claim 7, wherein the sensor portion includes:
    a communication filter generating the third frequency of the transmitted data signals representing the delivery pressure.

9. The electro-pneumatic device as set forth in claim 1, wherein:
    the sensor portion receives the control signals at the third frequency, the control signals controlling sensor portion electronics to transmit the data signals representing the delivery pressure.

10. A communication system between an electro-pneumatic valve and an electronic control unit, comprising:
    a power and control bus;
    an electronic control unit electrically communicating with the power and control bus; and
    an electro-pneumatic device electrically communicating with the power and control bus, the electro-pneumatic device including:
        a sensor portion transmitting/receiving electronic control messages to/from the electronic control unit via the power and control bus, the electronic control messages including control signals at a plurality of frequencies, the sensor portion being powered by a first of the frequencies of the control signals received by the electro-pneumatic device during a first time period; and
        a valve portion electrically communicating with the sensor portion, the valve portion including a valve that is alternately set to an open state and a closed state based on a second of the plurality of frequencies of the received control signals, the sensor sensing a delivery pressure of the valve and transmitting to the electronic control unit, via the power and control bus, data signals representing the delivery pressure, the data signals being transmitted at a third of the plurality of frequencies, the first frequency being faster than the second frequency, the third frequency being faster than the first frequency, the data signals of the third frequency being superimposed with the control signals of the first frequency received by the electro-pneumatic device during a second time period, which is after the first time period, and the data signals of third frequency being superimposed with the control signals of the first frequency and the control signals of the second frequency received by the electro-pneumatic device during a third time period which is after the second time period.

11. The communication system between an electro-pneumatic valve and an electronic control unit as set forth in claim 10, wherein:
the first frequency is about 10 times the second frequency; and
the third frequency is about 100 times the second frequency.

12. The communication system between an electro-pneumatic valve and an electronic control unit as set forth in claim 10, wherein:
the electronic control unit superimposes the third frequency onto the second frequency of the control messages transmitted to the electro-pneumatic device.

13. The communication system between an electro-pneumatic valve and an electronic control unit as set forth in claim 10, wherein:
the electronic control unit transmits control signals to the electro-pneumatic device at the second frequency.

14. The communication system between an electro-pneumatic valve and an electronic control unit as set forth in claim 13, wherein:
the valve portion receives error-check data signals from the electronic control unit at a fourth frequency.

15. The communication system between an electro-pneumatic valve and an electronic control unit as set forth in claim 14, wherein the sensor portion includes:
a power filter filtering the first frequency of the received control signals, the filtered first frequency being transmitted to the sensor for powering the sensor; and
a communication filter filtering the third frequency of the received control signals received from the electronic control unit and filtering the third frequency of the data signals transmitted to the electronic control unit.

16. A method for controlling an electro-pneumatic device, the method comprising:
transmitting a control signal of a first frequency from an electronic control unit to an electro-pneumatic device during a first time period, via a power control bus, for powering a sensor in the electro-pneumatic device;
transmitting a control signal of a second frequency from the electronic control unit to the electro-pneumatic device, via the power control bus, for controlling a state of a valve in the electro-pneumatic device;
sensing a delivery pressure of the valve;
transmitting a data signal, representing the delivery pressure, of a third frequency from the electro-pneumatic device to the electronic control unit via the power control bus, the first frequency being faster than the second frequency, the third frequency being faster than the first frequency;
superimposing the data signal of the third frequency with the control signal of the first frequency during a second time period; and
superimposing the data signal of the third frequency with the control signal of first frequency and the control signal of the second frequency during a third time period.

17. The method for controlling an electro-pneumatic device as set forth in claim 16, further including:
filtering the first frequency of the control signals received from the electronic control unit; and
powering the sensor with the filtered first frequency of the control signals.

18. The method for controlling an electro-pneumatic device as set forth in claim 16, further including:
generating the second frequency between about 66 Hz to about 100 Hz;
generating the first frequency as about 10 times the second frequency; and
generating the third frequency as about 100 times the second frequency.

19. The method for controlling an electro-pneumatic device as set forth in claim 16, further including:
receiving error-check data signals into the valve portion at a fourth frequency from the electronic control unit.

* * * * *